(12) United States Patent
Meschter et al.

(10) Patent No.: US 9,945,036 B2
(45) Date of Patent: Apr. 17, 2018

(54) HOT CORROSION-RESISTANT COATINGS AND COMPONENTS PROTECTED THEREWITH

(75) Inventors: Peter Joel Meschter, Niskayuna, NY (US); Raymond Grant Rowe, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 503 days.

(21) Appl. No.: 13/053,378

(22) Filed: Mar. 22, 2011

(65) Prior Publication Data

US 2012/0244383 A1   Sep. 27, 2012

(51) Int. Cl.
  *B32B 15/04* (2006.01)
  *B32B 9/00* (2006.01)
  (Continued)

(52) U.S. Cl.
  CPC .............. *C23C 28/042* (2013.01); *B32B 9/00* (2013.01); *B32B 9/005* (2013.01); *B32B 15/04* (2013.01); *B32B 18/00* (2013.01); *C04B 35/48* (2013.01); *C04B 35/50* (2013.01); *C04B 41/009* (2013.01); *C04B 41/5044* (2013.01);
  (Continued)

(58) Field of Classification Search
  CPC ........... B32B 15/04; B32B 18/00; B32B 9/00; B32B 9/005; B32B 2315/02; B32B 2603/00; C23C 28/042; C23C 28/3215; C23C 28/34; C23C 28/3455; C23C 28/345; F05D 2690/95; F05D 2033/2218; C04B 35/565; C04B 35/806; C04B 35/584; C04B 35/58085; C04B 35/4527; C04B 35/5096; C04B 35/5037; C04B 35/5031; C04B 35/455; C04B 35/5048; Y02T 50/67; Y02T 50/672; Y10T 428/31678; Y10T 428/12611; Y10T 428/12618;
  (Continued)

(56) References Cited

U.S. PATENT DOCUMENTS 4,339,509 A  7/1982  Dardi et al.
4,913,961 A  4/1990  Jones et al.
(Continued)

FOREIGN PATENT DOCUMENTS

CN  101631888 A   1/2010
EP  1 683 773  *  7/2006
(Continued)

OTHER PUBLICATIONS

C. M. Kozak & P. Mountford, "Zirconium & Hafnium: Inorganic & Coordination Chemistry," Encyclopedia of Inorganic Chemistry, John Wiley & Sons, Ltd., 2006 (no month), pp. 1-24.*
(Continued)

*Primary Examiner* — Michael E. La Villa
(74) *Attorney, Agent, or Firm* — John P. Darling

(57) ABSTRACT

A coating system on a superalloy or silicon-containing substrate of an article exposed to high temperatures. The coating system includes a coating layer that overlies the substrate and is susceptible to hot corrosion promoted by molten salt impurities. A corrosion barrier coating overlies the coating layer and contains at least one rare-earth oxide-containing compound that reacts with the molten salt impurities to form a dense, protective byproduct barrier layer.

19 Claims, 1 Drawing Sheet

(51) Int. Cl.
*B32B 18/00* (2006.01)
*F01D 5/28* (2006.01)
*C23C 28/04* (2006.01)
*C04B 35/48* (2006.01)
*C04B 41/50* (2006.01)
*C04B 35/50* (2006.01)
*C04B 41/00* (2006.01)
*C04B 41/52* (2006.01)
*C04B 41/89* (2006.01)
*C23C 28/00* (2006.01)

(52) U.S. Cl.
CPC .............. *C04B 41/52* (2013.01); *C04B 41/89* (2013.01); *C23C 28/3215* (2013.01); *C23C 28/34* (2013.01); *C23C 28/3455* (2013.01); *F01D 5/28* (2013.01); *F01D 5/284* (2013.01); *F01D 5/288* (2013.01); *F05D 2260/95* (2013.01); *F05D 2300/2118* (2013.01); *Y02T 50/67* (2013.01); *Y02T 50/672* (2013.01); *Y10T 428/12611* (2015.01); *Y10T 428/12618* (2015.01); *Y10T 428/12931* (2015.01); *Y10T 428/12944* (2015.01); *Y10T 428/12951* (2015.01); *Y10T 428/12972* (2015.01); *Y10T 428/31678* (2015.04)

(58) Field of Classification Search
CPC ..... Y10T 428/12931; Y10T 428/12944; Y10T 428/12951; Y10T 428/12972
USPC ....... 428/633, 678, 679, 680, 685, 446, 448, 428/450, 457, 632, 697, 702
See application file for complete search history.

(56) References Cited

U.S. PATENT DOCUMENTS

| | | |
|---|---|---|
| 5,985,470 A | 11/1999 | Spitsberg et al. |
| 6,177,200 B1 * | 1/2001 | Maloney ...................... 428/472 |
| 6,254,935 B1 | 7/2001 | Eaton et al. |
| 6,296,941 B1 | 10/2001 | Eaton, Jr. et al. |
| 6,299,988 B1 | 10/2001 | Wang et al. |
| 6,312,763 B1 | 11/2001 | Eaton, Jr. et al. |
| 6,352,788 B1 | 3/2002 | Bruce |
| 6,352,790 B1 | 3/2002 | Eaton et al. |
| 6,365,288 B1 | 4/2002 | Eaton et al. |
| 6,387,456 B1 | 5/2002 | Eaton, Jr. et al. |
| 6,410,148 B1 | 6/2002 | Eaton, Jr. et al. |
| 6,562,409 B2 | 5/2003 | Koshkarian et al. |
| 6,586,115 B2 | 7/2003 | Rigney et al. |
| 6,630,200 B2 | 10/2003 | Wang et al. |
| 6,645,649 B2 | 11/2003 | Tanaka et al. |
| 6,759,151 B1 | 7/2004 | Lee |
| 6,764,771 B1 | 7/2004 | Heimberg et al. |
| 6,790,486 B2 | 9/2004 | Movhan et al. |
| 6,808,799 B2 | 10/2004 | Darolia et al. |
| 6,890,668 B2 | 5/2005 | Bruce et al. |
| 6,892,126 B2 | 5/2005 | Tashiro et al. |
| 7,407,718 B2 | 8/2008 | Hazel et al. |
| 7,534,290 B2 | 5/2009 | Hill |
| 7,595,114 B2 | 9/2009 | Meschter et al. |
| 2003/0224200 A1 | 12/2003 | Bruce |
| 2005/0034669 A1 | 2/2005 | Movchan et al. |
| 2005/0126494 A1 | 6/2005 | Darolia et al. |
| 2008/0292859 A1 * | 11/2008 | Subramanian ................ 428/220 |
| 2010/0136349 A1 * | 6/2010 | Lee ...................... C04B 41/009 428/446 |

FOREIGN PATENT DOCUMENTS

| | | |
|---|---|---|
| WO | 2008110607 A1 | 9/2008 |
| WO | 2010071768 A1 | 6/2010 |

OTHER PUBLICATIONS

A. Cleave, "Atomic Scale Simulations for Waste Form Applications," Ph.D. U. London, 2006 (no month), 281 pages.*

Sa Li, Zhan-Guo Liu, Jia-Hu Ouyang; Hot Corrosion Behavior of Yb2Zr2O7 ceramic coated with V2O5 at temperatures of 600-800 C in air; Corrosion Science; Oct. 2010; vol. 52, Issue 10, pp. 3568-3572.

M.E. Westwood, J.D. Webster, R.J. Day, F.H. Hayes, R. Taylor; Oxidation Protection for Carbon Fibre Composites; Journal of Materials Science; vol. 31, Issue 6, pp. 1389-1397.

K.N. Lee; Current Status of Environmental Barrier Coatings for Si-Based Ceramics; Surface and Coatings Technology; Nov. 2010; vols. 133-134, pp. 1-7.

Search Report and Written Opinion from corresponding EP Application No. 12160771.7-2122 dated Jul. 30, 2012.

Clarke et al., "Materials Design for Next Generation Thermal Barrier Coatings", vol. 33, No. 1, pp. 383-417, Mar. 18, 2003.

Cao et al., "Ceramic materials for thermal barrier coatings", Journal of the European Ceramic Society, vol. 24, No. 1, pp. 1-10, Jan. 1, 2004.

Chinese Office Action issued in connection with corresponding CN Application No. on 201210087734.9 dated Dec. 31, 2014.

* cited by examiner

HOT CORROSION-RESISTANT COATINGS AND COMPONENTS PROTECTED THEREWITH

BACKGROUND OF THE INVENTION

This invention relates to coating systems suitable for protecting components exposed to high-temperature environments, such as the hot gas flow path through a gas turbine engine. More particularly, this invention is directed to coatings capable of protecting an underlying coating or substrate from hot corrosion initiated by molten salts.

Higher operating temperatures for gas turbine engines are continuously sought in order to increase their efficiency. Nickel-, cobalt- and iron-base superalloys have found wide use as materials for components of gas turbine engines in various industries, including the aircraft and power generation industries. As operating temperatures increase, the high temperature durability of engine components must correspondingly increase. For this reason, thermal barrier coatings (TBC) are commonly used on components such as combustors, high pressure turbine (HPT) blades and vanes. The thermal insulation of a TBC enables components formed of superalloys and other high temperature materials to survive higher operating temperatures, increases component durability, and improves engine reliability. TBCs typically comprise a thermal-insulating ceramic material deposited on an environmentally-protective bond coat to form what is termed a TBC system. Bond coat materials widely used in TBC systems include oxidation-resistant overlay coatings such as MCrAlX (where M is iron, cobalt and/or nickel, and X is yttrium, a rare-earth metal, and/or another reactive metal), and oxidation-resistant diffusion coatings that may contain compounds such as aluminide intermetallics. Yttria-stabilized zirconia (YSZ) is widely used as the thermal insulating ceramic material of TBC systems because of its high temperature capability, low thermal conductivity, and relative ease of deposition.

In order to achieve higher operating temperatures for gas turbine engines and thus increase their efficiency, alternative materials have been proposed to replace superalloys. In particular, silicon-based non-oxide ceramics, most notably with silicon carbide (SiC), silicon nitride ($Si_3N_4$), and/or silicides serving as a reinforcement phase and/or a matrix phase, are candidates for high temperature applications, such as combustor liners, vanes, shrouds, airfoils, and other hot section components of gas turbine engines. However, when exposed in a high-temperature, water vapor-rich combustion atmosphere such as that in a gas turbine engine, components formed of Si-based ceramics lose mass and recede because of the formation of volatile silicon hydroxide ($Si(OH)_4$). The recession rate due to volatilization or corrosion is sufficiently high in a gas turbine engine environment to require an environmentally protective coating, commonly referred to as an environmental barrier coating (EBC).

Critical requirements for an EBC intended to protect gas turbine engine components formed of a Si-based material include stability, low thermal conductivity, a coefficient of thermal expansion (CTE) compatible with that of the Si-based ceramic material, low permeability to oxidants, and chemical compatibility with the Si-based material and a silica scale that forms by oxidation of the Si-based material or (as discussed below) a Si-based protective bondcoat that may be present to promote adhesion of the EBC to the Si-based ceramic material. Silicates, and particularly barium-strontium-aluminosilicates (BSAS; $(Ba_{1-x}Sr_x)O$—$Al_2O_3$—$SiO_2$) and other alkaline-earth aluminosilicates, have been proposed as EBCs in view of their environmental protection properties and low thermal conductivity. For example, U.S. Pat. Nos. 6,254,935, 6,352,790, 6,365,288, 6,387,456, and 6,410,148 to Eaton et al. disclose the use of BSAS and alkaline-earth aluminosilicates as outer protective coatings for Si-based substrates, with stoichiometric BSAS (molar ratio: $0.75BaO.0.25SrO.Al_2O_3.2SiO_2$; molar percent: $18.75BaO.6.25SrO.25Al_2O_3.50SiO_2$) generally being the preferred alkaline-earth aluminosilicate composition. The use of rare-earth (RE) silicates such as $RE_2Si_2O_7$ and $RE_2SiO_5$ as protective EBC coating materials has also been proposed, as reported in U.S. Pat. Nos. 6,296,941, 6,312,763, 6,645,649, 6,759,151 and 7,595,114. As a particular example, an EBC is disclosed in U.S. Pat. No. 6,759,151 as comprising a rare-earth silicate of formula $RE_2SiO_5$, $RE_4Si_3O_{12}$, or $RE_2Si_2O_7$, where RE is Sc, Dy, Ho, Er, Tm, Yb, Lu, Eu, Tb, or combinations thereof. Intermediate layers such as mullite ($3Al_2O_3.2SiO_2$) and bondcoats such as silicon, disposed between silicon-containing substrates and their protective EBC layers, have been proposed to promote EBC adhesion to the substrate, limit interlayer reactions, and prevent penetration of oxidants into the substrate. For example, commonly-assigned U.S. Pat. Nos. 6,299,988 and 6,630,200 to Wang et al. disclose silicon and silicon-containing materials as suitable bondcoat materials, particularly for substrates containing SiC or silicon nitride. If the particular component will be subjected to surface temperatures in excess of about 2500° F. (about 1370° C.), an EBC can be thermally protected with an overlying thermal barrier coating (TBC) in accordance with commonly-assigned U.S. Pat. No. 5,985,470 to Spitsberg et al. In combination, these layers form what has been referred to as a thermal/environmental barrier coating (T/EBC) system. As noted above, the most commonly used TBC material for gas turbine applications is yttria-stabilized zirconia (YSZ). A transition layer may be provided between a TBC and an underlying EBC, for example, mixtures of YSZ with alumina, mullite, and/or an alkaline-earth metal aluminosilicate as taught in commonly-assigned U.S. Pat. No. 6,444,335 to Wang et al.

It is known that high temperatures within the engine environment can cause contaminants in the fuel to corrode components formed of nickel-, cobalt- and iron-based superalloys, as well as corrode and destabilize TBC systems used to protect them. This phenomenon, known as hot corrosion, is an accelerated corrosion resulting from the presence of impurities such as $Na_2SO_4$ and $V_2O_5$, which form molten salt deposits on the surface of the component or its protective surface oxides. The corrosive attack by deposits of molten salts can occur over intermediate temperature ranges. For instance, Type I sodium hot corrosion caused by molten $Na_2SO_4$ deposits typically occurs over a temperature range of about 880° C. to about 1000° C., whereas vanadium hot corrosion caused by molten $V_2O_5$ deposits typically occurs over a temperature range of about 660° C. to about 1000° C. Although the detailed mechanism of hot corrosion varies with the nature of the material attacked and that of the corrodant, in all cases degradation of the structural material or coating can be rapid and the component can be severely damaged in tens to thousands of hours, depending on surface temperature, deposition rate of the molten salt, and concentration of the deleterious cation (for example, sodium and/or vanadium) in the fuel. This type of corrosion, unlike oxidation, is known to consume superalloy components at a rapid rate and lead to catastrophic failure. The susceptibility of Si-based materials such as SiC and $Si_3N_4$ by $Na_2SO_4$ and $V_2O_5$ impurities has been demonstrated in laboratory experiments. On the other hand, the susceptibility of EBC materials, including BSAS and RE silicates, to hot corrosion from $Na_2SO_4$ and $V_2O_5$ impurities is largely unknown.

Despite the above issues and uncertainties, there is a desire within industries that use gas turbine engines to use cheaper low-grade fuels, which consequently contain higher concentrations of salt impurities and therefore exacerbate the problem of hot corrosion. The most common methods of mitigating hot corrosion include specifying only fuels that contain low and relatively harmless concentrations of corrosive elements (for example, less than 1 ppm Na and less than 0.5 ppm V), water washing fuels to remove soluble Na species prior to combustion, and injecting measured quantities of a suitable compound containing a reactive element, for example, magnesium, to react with vanadium in the fuel and form high melting temperature, relatively inert compounds such as $Mg_3V_2O_8$. In an era of escalating fuel prices, it would be highly advantageous to run turbine engines on cheaper fuels that contain relatively high levels of corrosive species, for example, in excess of 10 ppm of $Na_2SO_4$ and/or $V_2O_5$. Aside from the use of reactive elements and washing fuels, additional measures would be desirable to permit the use of such fuels.

BRIEF DESCRIPTION OF THE INVENTION

The present invention generally provides a coating system for superalloy and Si-containing materials, particularly for components exposed to high temperatures, including the hostile thermal environments of gas turbine engines used in the aircraft and power generation industries. Examples of such materials include metallic compositions such as nickel-, cobalt- and iron-based superalloys, and Si-containing materials such as silicon, silicon carbide, silicon nitride, metal silicide alloys such as niobium and molybdenum silicides, etc. More particular examples of Si-containing materials include those with a dispersion of silicon carbide, silicon nitride, metal silicide and/or silicon particles as a reinforcement material in a metallic or nonmetallic matrix, as well as those having a silicon carbide, silicon nitride, metal silicide and/or silicon-containing matrix, and particularly composite materials that employ silicon carbide, silicon nitride, a metal silicide and/or silicon as both the reinforcement and matrix materials (e.g., SiC/SiC ceramic matrix composites (CMCs)).

According to a first aspect of the invention, the coating system overlies a substrate formed of a superalloy or silicon-containing material. The substrate and/or at least one coating layer of the coating system is susceptible to hot corrosion promoted by molten salt impurities. The coating system further includes a corrosion barrier coating that overlies the coating system and contains at least one rare-earth oxide-containing compound that reacts with the molten salt impurities to form a dense, protective barrier layer that preferably defines a continuous outermost surface layer of the coating system.

According to a second aspect of the invention, a gas turbine engine component is provided that includes a substrate formed of a superalloy or silicon-containing material, and a coating system on the substrate. The substrate or at least one coating layer of the coating system is susceptible to hot corrosion promoted by molten salt impurities. A corrosion barrier coating overlies the coating system and contains at least one rare-earth oxide-containing compound that reacts with the molten salt impurities to form a dense, protective barrier layer that preferably defines a continuous outermost surface layer of the coating system.

A technical effect of the invention is that, by reacting with molten salt deposits that form as the result of impurities, for example $Na_2SO_4$ or $V_2O_5$, the rare-earth oxide-containing compound of the corrosion barrier coating is capable of forming a byproduct barrier layer whose chemical nature prevents destabilization of the underlying substrate and/or coating system, for example, a thermal barrier coating or an environmental barrier coating (TBCs and EBCs), by preventing or at least retarding penetration of further molten salt impurities. As such, the corrosion barrier coating is capable of greatly enhancing the resistance of the underlying substrate and/or coating system to salt corrosion (hot corrosion). Additional advantages of the rare-earth oxide-containing corrosion barrier coating include resistance to volatilization in water vapor-rich fuel combustion atmospheres and coefficients of thermal expansion that substantially match those of a superalloy or Si-containing substrate to be protected, thus promoting resistance to deleterious cracking or spallation. The invention is applicable to use with known coating materials used in thermal barrier and environmental barrier coating systems, and the corrosion barrier coating can be deposited using various processes commonly known in the art.

Other aspects and advantages of this invention will be better appreciated from the following detailed description.

DETAILED DESCRIPTION OF THE INVENTION

The present invention provides a rare-earth (RE) oxide-containing coating suitable for protecting superalloy components and silicon-containing components and their protective TBC and EBC systems (including thermal/environmental barrier coating (T/EBC) systems) from attack and destabilization by molten salts, such as those that form as the result of impurities present in low grade fuels. Notable examples of such salts include, but are not limited to, those that form from $Na_2SO_4$ and/or $V_2O_5$. Examples of superalloy components and silicon-containing components protected by TBC and EBC systems include combustor components, turbine blades and vanes, and other components within the hot gas flow path of gas turbine engines used in various industries, including the aircraft and power generation industries. Examples of superalloy materials include nickel-based, cobalt-based and iron-based alloys, and examples of silicon-containing materials include those with a dispersion of silicon carbide, silicon nitride, metal silicides (such as niobium and molybdenum silicides) and/or silicon reinforcement material in a metallic or nonmetallic matrix, as well as those having a silicon carbide, silicon nitride and/or silicon-containing matrix, and particularly composite materials that employ silicon carbide, silicon nitride, metal silicides (such as niobium and molybdenum silicides) and/or silicon as both the reinforcement and matrix materials (e.g., ceramic matrix composites (CMCs)). While the advantages of this invention will be described with reference to gas turbine engine components, the teachings of the invention are generally applicable to any component whose substrate and/or coating system is subject to attack by molten salts.

Figure 1:
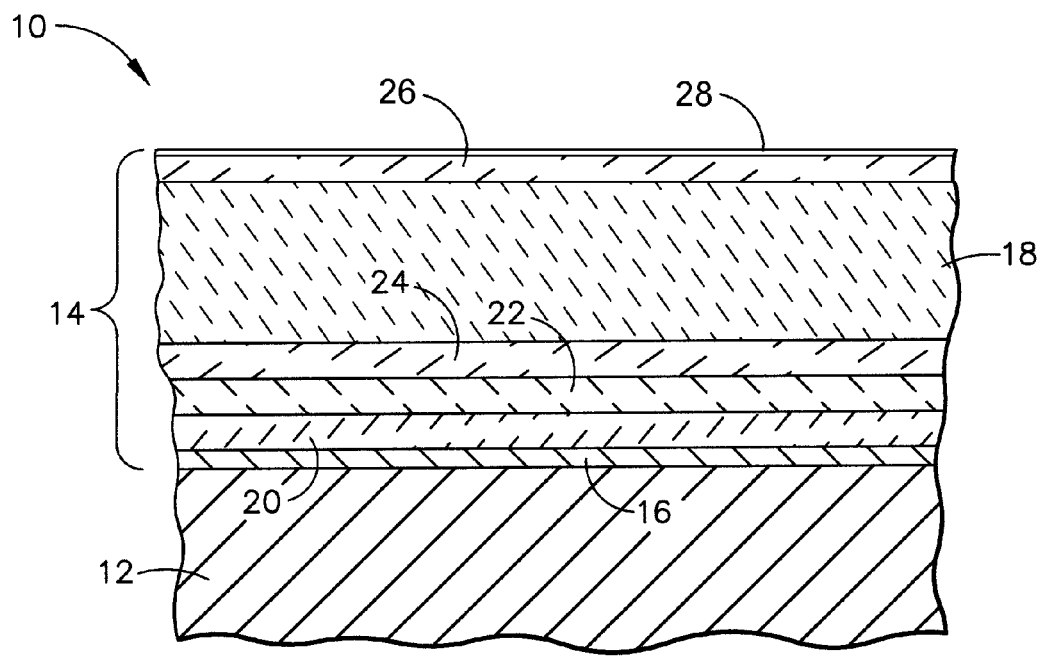
FIG. 1 schematically represents a cross-sectional view of a gas turbine engine component formed of a Si-containing material and protected by a thermal/environmental barrier coating system, and further provided with a corrosion barrier coating in accordance with this invention.

A multilayer thermal/environmental barrier coating T/EBC system 14 is schematically represented in FIG. 1. As shown in FIG. 1, a substrate 12 of a silicon-containing component 10 is protected by the coating system 14, which optionally includes a thermal barrier coating (TBC) 18. The coating system 14 provides environmental protection to the underlying substrate 12 of the component 10, while the optional TBC 18 reduces the operating temperature of the component 10 and interior layers 16, 20, 22, and 24 of the coating system 14, thereby enabling the component 10 to survive within higher temperature environments than otherwise possible. While the coating system 14 is represented in FIG. 1 as containing each of the layers 16, 18, 20, 22 and 24, it will become apparent from the following discussion that one or more of these layers could be omitted from the coating system 14. As such, the coating system 14 of FIG. 1 represents one of a variety of different coating systems within the scope of the invention.

The interior layer 22 of the coating system 14 represented in FIG. 1 will be referred to as an environmental barrier layer 22 that is adhered to the substrate 12 by a bondcoat 16 directly applied to the substrate 12. Other layers represented in FIG. 1 include a transition or intermediate layer 20 and a transitional layer 24. In accordance with a preferred aspect of this invention, the coating system 14 further includes a corrosion barrier coating 26 that is deposited as the outermost layer of the component 10. As will be discussed in more detail below, the corrosion barrier coating 26 prevents or at least inhibits corrosion attack of the interior layers 16, 20, 22, 24, and 18, and particularly the environmental barrier layer 22, by inhibiting the penetration of molten salts.

The major mechanism for degradation of silicon carbide (as well as silicon and other silicon compounds) in a corrosive environment is the formation of volatile silicon hydroxide ($Si(OH)_4$) products. Because the diffusivity of oxidants in materials typically suitable for use as the TBC 18 is generally very high, especially if the TBC 18 has a columnar grain structure resulting from deposition by PVD, the barrier layer 22, individually and preferably in combination with other layers of the coating system 14, exhibits low diffusivity to oxidants, such as water vapor, to inhibit the formation of deleterious crystalline oxide products within the bondcoat 16 and/or substrate 12. Preferred compositions for the barrier layer 22 are also chemically and physically compatible with the substrate 12 to remain adherent to the region 12 under severe thermal conditions. In accordance with the teachings of U.S. Pat. Nos. 5,496,644, 5,869,146, 6,254,935, 6,352,790, 6,365,288, 6,387,456, and 6,410,148, the relevant contents of which are incorporated herein by reference, suitable materials for the barrier layer 22 include alkaline-earth metal aluminosilicates, notable examples of which include calcium aluminosilicates, barium aluminosilicates, strontium aluminosilicates, and especially BSAS (as noted above). Alternatively or in addition, the barrier layer 22 may contain rare-earth silicates, for example, in accordance with U.S. Pat. Nos. 6,296,941, 6,312,763, 6,645, 649 and 6,759,151. BSAS (and particularly stoichiometric BSAS) and other preferred compositions for the barrier layer 22 provide environmental protection for the Si-containing substrate 12 as well as the underlying layers 16 and 20, as discussed above. As a result, the barrier layer 22 is able to inhibit the growth of a deleterious crystalline silica layer at the substrate 12 when the component 10 is exposed to the oxidizing combustion environment of a gas turbine engine. In addition, preferred compositions for the barrier layer 22 exhibit good thermal barrier properties due to low thermal conductivity, are physically compliant with SiC-containing substrates such as the substrate 12, and are relatively compatible with the Si-containing substrate 12 in terms of CTE. A suitable thickness range for the barrier layer 22 is about 50 to about 250 micrometers.

As noted above, the bondcoat 16 of the coating system 14 serves to adhere the environmental barrier layer 22 (and, therefore, the remaining layers 18, 20, 24 and 26) to the substrate 12. Preferred compositions for the bondcoat 16 contain silicon. For example, the bondcoat 16 may contain or consist of elemental silicon, silicon with one or more additional metal, intermetallic or ceramic phases (for example, silicon carbide and/or silicon nitride), and/or one or more silicon alloys (for example, silicon aluminum, silicon chromium, silicon magnesium, silicon calcium, silicon molybdenum and/or silicon titanium alloys). In accordance with commonly-assigned U.S. Pat. Nos. 6,299,988 and 6,630,200 to Wang et al., the inclusion of silicon in the layer 16 is useful to improve oxidation resistance of the substrate 12 and enhance bonding of the other layers 18, 20, 22, 24 and 26 to the substrate 12, particularly if the region 12 contains SiC or silicon nitride. A suitable thickness for the layer 16 is about 50 to about 125 micrometers.

The intermediate layer 20 is useful in certain applications to promote the adhesion of the barrier layer 22 to the bondcoat 16 and the underlying substrate 12 of the component 10. Notable materials for the intermediate layer 20 include mullite and mixtures of mullite and an alkaline-earth aluminosilicate, for example, BSAS, or rare-earth silicates of formula $RE_2Si_2O_7$. A suitable thickness range for the intermediate layer 20 is about 25 to about 75 micrometers depending on the particular application.

The TBC 18 is employed to protect the underlying barrier layer 22 and the component 10 it covers from high operating temperatures. Hot gas path components such as buckets, nozzles, and shrouds in turbine engines burning liquid fuels are often protected by thermal barrier coatings (TBCs). Suitable materials for the TBC 18 include YSZ alone or with appropriate additions of other doping oxides capable of reducing the CTE of the TBC 18. Alternative materials for the TBC 18 include other ceramic materials known and proposed in the art for thermal barrier coatings, such as zirconate and perovskite materials. A suitable thickness range for the TBC 18 is about 25 to about 750 micrometers, depending on the particular application.

The transition layer 24 is an optional layer of the coating system 14 that, if present, may be used to mitigate a CTE mismatch between the TBC 18 and the barrier layer 22, and/or inhibit reactions between the TBC 18 and barrier layer 22, for example, if the TBC 18 contains YSZ and the barrier layer 22 contains stoichiometric BSAS. If the TBC 18 contains YSZ and the barrier layer 22 contains BSAS, particularly suitable materials for the transitional layer 24 include mixtures of YSZ with alumina, mullite, and/or an alkaline-earth metal aluminosilicate, as taught in commonly-assigned U.S. Pat. No. 6,444,335 to Wang et al. Transition layer materials that have been proposed in the past also include rare-earth silicates of formula $RE_2Si_2O_7$. Suitable thicknesses for the transition layer 24 will depend on the particular application, though thicknesses in a range of up to about 100 micrometers are typically adequate.

During investigations leading to the present invention, uncoated Si-containing substrates and Si-containing substrates protected by EBC systems were evaluated for susceptibility to hot corrosive attack by deposits of molten salts over intermediate temperature ranges. As discussed previously, Type I sodium hot corrosion is caused by molten $Na_2SO_4$ deposits, and vanadium hot corrosion is caused by molten $V_2O_5$ deposits. The corrodants that initiate the corrosive attack can be present as impurities in the fuel combusted in a gas turbine engine. The detailed mechanism of hot corrosion varies with the nature of the material attacked and that of the corrodant, the temperature and time of exposure, deposition rate of the molten salt, and concentration of the deleterious cation (for example, sodium and/or vanadium) in the fuel. The uncoated Si-containing substrates and the Si-containing substrates protected by EBC systems were both shown to be very susceptible to corrosive attack. It was the determination of the investigations that CMCs confer no intrinsic advantage over their superalloy alternatives for turbines burning low-grade fuels containing salt-forming impurities. Since the TBC 18 as well as other layers 16, 20 and 22 of the coating system 14 may contain Si and/or complex aluminosilicates, they are susceptible to hot corrosion and are in need of further protective measures.

According to a preferred aspect of the invention, to protect the underlying layers 16, 18, 20, 22 and 24 of the coating system 14 from hot corrosion, the outermost surface of the deposited coating system 14 is formed by the corrosion barrier coating 26, and the corrosion barrier coating 26 contains at least one rare-earth (RE) oxide-containing compound capable of reacting with one or more molten salts at elevated temperatures, for example, liquid salt corrodants that form from impurities such as $Na_2SO_4$, $V_2O_5$, $K_2SO_4$, and $PbSO_4$ over a range of about 600° C. to about 1000° C. Furthermore, the reaction between the rare-earth oxide-containing compound and the molten salts must form a dense, protective byproduct barrier layer 28 on the surface of the corrosion barrier coating 26. The byproduct barrier layer 28 has a higher melting temperature (for example, about 1200° C. or higher) than the molten salt itself and prevents or retards penetration of further molten salt to the underlying structure.

Particularly suitable rare-earth oxide-containing compounds include, but are not limited to, rare-earth oxides ($RE_2O_3$), rare-earth phosphates ($REPO_4$), rare-earth zirconates ($RE_2Zr_2O_7$), rare-earth hafnates ($RE_2Hf_2O_7$), and/or other compounds containing a rare-earth oxide, nonlimiting examples of which include rare-earth monosilicates ($RE_2SiO_5$) and rare-earth disilicates ($RE_2Si_2O_7$). In preferred embodiments of this invention, the rare-earth (RE) element is one or more of Sc, Y, La, Ce, Pr, Nd, Pm, Sm, Eu, Gd, Tb, Dy, Ho, Er, Tm, Yb and/or Lu. The one or more rare-earth oxide-containing compounds are present in the corrosion barrier coating 26 in an amount sufficient to form the byproduct barrier layer 28, represented in FIG. 1 as a continuous and outermost layer of the coating system 14 and the component 10. For this purpose, the one or more rare-earth oxide-containing compounds should constitute, by weight, at least 15%, for example, about 30% to about 100%, and more preferably about 50% to about 100% of the corrosion barrier coating 26. In addition to the rare-earth oxide-containing compounds, the corrosion barrier coating 26 may further contain conventional TBC materials, including stabilized zirconia and particularly yttria-stabilized zirconia (YSZ), and/or other known TBC materials, for example, other ceramic materials such as zirconates and perovskite materials. A suitable thickness for the corrosion barrier coating 26 is at least 50 micrometers, for example, about 50 micrometers to about 200 micrometers, and more preferably about 75 micrometers to about 125 micrometers, with preferred thicknesses depending on the particular application.

As previously noted, the presence of one or more rare-earth oxide-containing compounds in the corrosion barrier coating 26 is intended to promote reaction with molten salts at elevated temperatures, and particularly with those salts that may form as a result of impurities in low grade fuels that may be combusted in gas turbine engines. Suitable compositions for the byproduct barrier layer 28 formed by the corrosion barrier coating 26 include $REVO_4$, $RE_2V_2O_7$ and/or Na—RE—Si—O compounds, wherein RE is the rare-earth metal of the rare-earth oxide of the corrosion barrier coating 26. For example, a corrosion barrier coating 26 containing at least 15 weight percent of a rare-earth oxide such as $Y_2O_3$ (yttria) as the rare-earth oxide-containing compound is capable of reacting with $V_2O_5$ to form a $YVO_4$ reaction product that has a melting temperature of about 1810° C. and forms the byproduct barrier layer 28, which then inhibits penetration of additional $V_2O_5$ into the interior layers 16, 20, 22, 24 and 18 of the coating system 14. Yttria is also believed to react with $Na_2O$-containing molten salts, such as $Na_2SO_4$, to form Na—Y—Si—O compounds whose melting temperatures may be as high as about 1365° C. As such, a corrosion barrier coating 26 containing a sufficient amount of yttria and/or one or more similar rare-earth oxide-containing compounds should be capable of protecting or at least significantly extending the lives of gas turbine components exposed to molten salts at high temperatures.

To promote its resistance to cracking or spallation and exposure of the underlying substrate 12 and coating layers 16, 20, 22, 24 and 18 to molten salts, the content of the one or more rare-earth oxide-containing compounds in the corrosion barrier coating 26 may be adjusted to increase its compliance and/or promote a coefficient of thermal expansion (CTE) that more closely matches that of the substrate it protects. For example, the corrosion barrier coating 26 may contain relatively large amounts of $Y_2Si_2O_7$, whose CTE is approximately 5 ppm/° C. and compatible with that of typical CMCs. Alternatively or in addition, the one or more rare-earth oxide-containing compounds may be chosen on the basis of having a CTE that more closely matches that of the remainder of the corrosion barrier coating 26. For example, CTEs of pure $RE_2O_3$ compounds and $REPO_4$ compounds are typically compatible with that of YSZ.

The corrosion barrier coating 26 may be used alone or in combination with other methods for protecting the coating system 14 and its underlying substrate 12 from hot corrosion. For example, the corrosion barrier coating 26 may be used in combination with one or more Mg compounds added to a liquid fuel containing vanadium to produce inert, high melting point products such as $Mg_3V_2O_8$. These products are known to immobilize vanadium-base impurities to inhibit vanadium-induced hot corrosion.

As with prior art bond coats and environmental coatings, the layers 16, 18, 20, 22, and 24 of the coating system 14 as well as the corrosion barrier coating 26 can be individually deposited by thermal spray processes, for example, air and vacuum plasma spraying (APS and VPS, respectively), though it is foreseeable that deposition could be performed by other known techniques, such as chemical vapor deposition (CVD) and high velocity oxy-fuel (HVOF) processes. The corrosion barrier coating 26 can also be deposited by known techniques such as slurry coating and PVD techniques, the latter of which can be performed to obtain a columnar grain structure within one or more of the individual layers 16, 18, 20, 22, 24 and 26. A heat treatment may be performed after deposition of individual layers 16, 18, 20, 22, 24 and/or 26 to relieve residual stresses created during cooling from elevated deposition temperatures.

Figure 2:
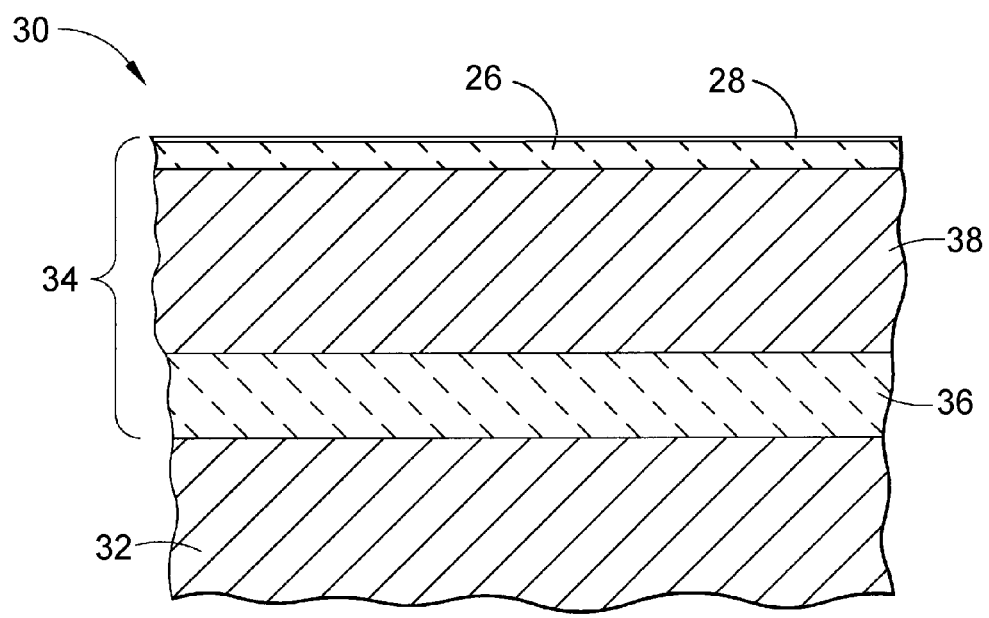
FIG. 2 schematically represents a cross-sectional view of a gas turbine engine component formed of a superalloy material and protected by a thermal barrier coating (TBC) system, and further provided with a corrosion barrier coating in accordance with this invention.

As previously noted, the corrosion barrier coating 26 of this invention is also applicable to use on superalloy components that are susceptible to molten salt corrosion (hot corrosion). FIG. 2 represents such a component 30 as having a superalloy substrate 32 protected by a thermal barrier coating (TBC) system 34. As also shown in FIG. 2, the TBC system 34 includes a metallic bondcoat 36 and a ceramic topcoat 38. The bondcoat 36 is intended to provide environmental protection to the underlying substrate 32 of the component 30, while the topcoat 38 (optionally in combination with internal cooling of the component 30) reduces the operating temperature of the component 30, thereby enabling the component 30 to survive within higher temperature environments than otherwise possible. A variety of materials can be used for the topcoat 38, including yttria-stabilized zirconia (YSZ) compositions that have are widely used because of their high temperature capability, low thermal conductivity, and relative ease of deposition. Suitable materials for the bondcoat 36 include oxidation-resistant overlay coatings such as MCrAlX (where M is iron, cobalt and/or nickel, and X is yttrium, a rare-earth metal, and/or reactive metal), and oxidation-resistant diffusion coatings that may contain compounds such as aluminide intermetallics. The corrosion barrier coating 26 and the byproduct barrier layer 28 that it forms can be as described in reference to FIG. 1.

While our invention has been described in terms of a preferred embodiment, it is apparent that other forms could be adopted by one skilled in the art. Accordingly, the scope of our invention is to be limited only by the following claims.

The invention claimed is:

1. A coating system on a substrate of an article, the coating system comprising:
   at least one coating layer overlying the substrate, the coating layer having a composition that is susceptible to hot corrosion promoted by molten salt impurities; and
   a corrosion barrier coating overlying the coating layer and wherein the corrosion barrier coating contains at least one rare-earth oxide-containing compound that reacts with the molten salt impurities to form a dense, protective byproduct barrier layer on the surface of the corrosion barrier coating, the at least one rare-earth oxide-containing compound being present in the corrosion barrier coating in an amount of at least 15 weight percent of the corrosion barrier coating
   wherein the rare-earth oxide-containing compound is comprised of a rare earth zirconate ($RE_2Zr_2O_7$), a rare earth hafnate ($RE_2Hf_2O_7$) or a mixture thereof
   wherein RE in the $RE_2Zr_2O_7$ is selected from the group consisting of Sc, Ce, Pr, Pm, Sm, Eu, Tb, Ho, Er, Tm, Yb, Lu and combinations thereof and
   wherein RE in the $RE_2Hf_2O_7$ is selected from the group consisting of Sc, Ce, Nd, Pm, Sm, Eu, Tb, Dy, Ho, Er, Tm, Yb, Lu and combinations thereof;
   wherein the substrate comprises a silicon-containing material selected from the group consisting of metal silicide alloys, metal matrix composites reinforced with any one or more of silicon carbide, silicon nitride, a silicide and/or silicon, composites having a matrix of silicon carbide, silicon nitride, a silicide and/or silicon, and composites with a silicon carbide, silicon nitride, silicide and/or silicon matrix reinforced with silicon carbide, silicon nitride, a silicide and/or silicon.

2. The coating system according to claim 1, further comprising at least one bondcoat between the substrate and the coating layer, the bondcoat comprising at least one of elemental silicon, silicon with one or more additional ceramic phases, and silicon alloys.

3. A coating system on a substrate of an article, the coating system comprising:
   at least one coating layer overlying the substrate, the coating layer having a composition that is susceptible to hot corrosion promoted by molten salt impurities; and
   a corrosion barrier coating overlying the coating layer and wherein the corrosion barrier coating contains at least one rare-earth oxide-containing compound that reacts with the molten salt impurities to form a dense, protective byproduct barrier layer on the surface of the corrosion barrier coating, the at least one rare-earth oxide-containing compound being present in the corrosion barrier coating in an amount of at least 15 weight percent of the corrosion barrier coating
   wherein the rare-earth oxide-containing compound is comprised of a rare earth zirconate ($RE_2Zr_2O_7$), a rare earth hafnate ($RE_2Hf_2O_7$) or a mixture thereof
   wherein RE in the $RE_2Zr_2O_7$ is selected from the group consisting of Sc, Ce, Pr, Pm, Sm, Eu, Tb, Ho, Er, Tm, Yb, Lu and combinations thereof and
   wherein RE in the $RE_2Hf_2O_7$ is selected from the group consisting of Sc, Ce, Nd, Pm, Sm, Eu, Tb, Dy, Ho, Er, Tm, Yb, Lu and combinations thereof;
   wherein the coating layer is an environmental barrier layer comprising silicates, alkaline-earth metal aluminosilicates and/or rare-earth metal silicates.

4. The coating system according to claim 3, further comprising at least one thermal barrier layer between the coating layer and the corrosion barrier coating.

5. The coating system according to claim 3, wherein the substrate comprises a metallic material selected from the group consisting of nickel-, cobalt- and iron-based superalloys.

6. The coating system according to claim 5, further comprising at least one bondcoat between the substrate and the coating layer, the bondcoat comprising an MCrAlX overlay coating (where M is iron, cobalt and/or nickel, and X is yttrium, a rare-earth metal, and/or reactive metal) or diffusion aluminide intermetallics.

7. The coating system according to claim 5, further comprising at least one thermal barrier layer between the coating layer and the corrosion barrier coating.

8. The coating system according to claim 3, wherein the corrosion barrier coating further comprises a thermal-insulating material comprising any one or more of stabilised zirconia, zirconate or perovskite material.

9. The coating system according to claim 3, wherein the corrosion barrier coating comprises, by weight, at least 30% of the at least one rare-earth oxide-containing compound.

10. The coating system according to claim 3, wherein the corrosion barrier coating comprises, by weight, about 50% to about 100% of the at least one rare-earth oxide-containing compound.

11. The coating system according to claim 3, further comprising a byproduct barrier layer on the surface of the corrosion barrier coating, the byproduct barrier layer defining an outermost surface layer of the coating system.

12. The coating system according to claim 3, wherein the article comprises a component of a gas turbine engine.

13. A coating system according claim 3 wherein RE in $RE_2Zr_2O_7$ is Sc, Ce, Pr, Pm, Eu, Tb, Ho, Er, Tm, Yb, or Lu.

14. A coating system on a substrate of an article, the coating system comprising:
   at least one coating layer overlying the substrate, the coating layer having a composition that is susceptible to hot corrosion promoted by molten salt impurities; and
   a corrosion barrier coating overlying the coating layer and wherein the corrosion barrier coating contains at least one rare-earth oxide-containing compound that reacts with the molten salt impurities to form a dense, protective byproduct barrier layer on the surface of the corrosion barrier coating, the at least one rare-earth oxide-containing compound being present in the corrosion barrier coating in an amount of at least 15 weight percent of the corrosion barrier coating
   wherein the rare-earth oxide-containing compound is comprised of a rare earth zirconate ($RE_2Zr_2O_7$), a rare earth hafnate ($RE_2Hf_2O_7$) or a mixture thereof
   wherein RE in the $RE_2Zr_2O_7$ is selected from the group consisting of Sc, Ce, Pr, Pm, Sm, Eu, Tb, Ho, Er, Tm, Yb, Lu and combinations thereof and
   wherein RE in the $RE_2Hf_2O_7$ is selected from the group consisting of Sc, Ce, Nd, Pm, Sm, Eu, Tb, Dy, Ho, Er, Tm, Yb, Lu and combinations thereof;
wherein the corrosion barrier coating further comprises rare-earth monosilicates ($RE_2SiO_5$) and/or rare-earth disilicates ($RE_2Si_2O_7$) wherein RE in the $RE_2SiO_5$ is selected from the group consisting of Sc, Ce, Pr, Pm, Sm, Eu, Tb, Ho, Er, Tm, Yb, Lu and combinations thereof and
   wherein RE in the $RE_2Si_2O_7$ is selected from the group consisting of Sc, Ce, Pr, Pm, Sm, Eu, Tb, Ho, Er, Tm, Yb Lu and combinations thereof.

15. A coating system on a substrate of an article, the coating system comprising:
   at least one coating layer overlying the substrate, the coating layer having a composition that is susceptible to hot corrosion promoted by molten salt impurities; and
   a corrosion barrier coating overlying the coating layer and wherein the corrosion barrier coating contains at least one rare-earth oxide-containing compound that reacts with the molten salt impurities to form a dense, protective byproduct barrier layer on the surface of the corrosion barrier coating, the at least one rare-earth oxide-containing compound being present in the corrosion barrier coating in an amount of at least 15 weight percent of the corrosion barrier coating
   wherein the rare-earth oxide-containing compound is comprised of a rare earth zirconate ($RE_2Zr_2O_7$), a rare earth hafnate ($RE_2Hf_2O_7$) or a mixture thereof
   wherein RE in the $RE_2Zr_2O_7$ is selected from the group consisting of Sc, Ce, Pr, Pm, Sm, Eu, Tb, Ho, Er, Tm, Yb, Lu and combinations thereof and
   wherein RE in the $RE_2Hf_2O_7$ is selected from the group consisting of Sc, Ce, Nd, Pm, Sm, Eu, Tb, Dy, Ho, Er, Tm, Yb, Lu and combinations thereof;
   wherein the coating system further comprises a byproduct barrier layer on the surface of the corrosion barrier coating, the byproduct barrier layer defining an outermost surface layer of the coating system, and
wherein the byproduct barrier layer comprises any one or more of $REVO_4$, $RE_2V_2O_7$ and Na—RE-Si—O compounds wherein RE in each of $REVO_4$, $RE_2V_2O_7$ and Na—RE-Si—O compounds is selected from the group consisting of Sc, Ce, Pr, Pm, Sm, Eu, Tb, Ho, Er, Tm, Yb, Lu and combinations thereof.

16. A gas turbine engine component comprising:
   a substrate comprising a superalloy or silicon-containing material;
   at least one bondcoat on the substrate;
   a barrier layer overlying the bondcoat, the barrier layer having a composition that is susceptible to hot corrosion promoted by molten salt impurities;
   a corrosion barrier coating overlying the barrier layer and having at least 15 weight percent of at least one rare-earth oxide-containing compound that reacts with the molten salt impurities, wherein the at least one rare-earth oxide-containing compound is selected from the group consisting of rare-earth zirconates ($RE_2Zr_2O_7$) and rare-earth hafniates ($RE_2Hf_2O_7$) and mixtures thereof,
   wherein RE in the $RE_2Zr_2O_7$ is selected from the group consisting of Sc, Ce, Pr, Pm, Sm, Eu, Tb, Ho, Er, Tm, Yb, Lu and combinations thereof and wherein RE in the $RE_2Hf_2O_7$ is selected from the group consisting of Sc, Ce, Pr, Nd, Pm, Sm, Eu, Tb, Dy, Ho, Er, Tm, Yb, Lu and combinations thereof; and
   a dense and continuous protective byproduct barrier layer on the surface of the corrosion barrier coating and formed by the at least one rare-earth oxide-containing compound reacting with the molten salt impurities, the byproduct barrier layer defining an outermost surface layer of the component;
   wherein the byproduct barrier coating comprises any one or more of $REVO_4$, $RE_2V_2O_7$ and Na—RE-Si—O compounds wherein RE in each of $REVO_4$, $RE_2V_2O_7$ and Na—RE-Si—O compounds is selected from the group consisting of Sc, Ce, Pr, Pm, Sm, Eu, Tb, Ho, Er, Tm, Yb, Lu and combinations thereof.

17. The gas turbine engine component according to claim 16, wherein the corrosion barrier coating comprises by weight, at least 30% of the at least one rare-earth oxide-containing compound.

18. The gas turbine engine component according to claim 16, wherein the barrier layer comprises silicates, alkaline-earth metal aluminosilicates, rare-earth metal silicates and/or yttria-stabilized zirconia.

19. A gas turbine engine component according to claim 16 wherein RE in $RE_2Zr_2O_7$ is Sc, Ce, Pr, Pm, Eu, Tb, Ho, Er, Tm, Yb or Lu.

* * * * *